(12) United States Patent
Etzkorn et al.

(10) Patent No.: US 10,488,677 B2
(45) Date of Patent: Nov. 26, 2019

(54) ELECTRONICS EMBEDDED IN RIGID GAS PERMEABLE CONTACT LENSES

(71) Applicant: Verily Life Sciences LLC, Mountain View, CA (US)

(72) Inventors: James Etzkorn, Mountain View, CA (US); Joshua N. Haddock, Mountain View, CA (US)

(73) Assignee: VERILY LIFE SCIENCES LLC, South San Francisco, CA (US)

( * ) Notice: Subject to any disclaimer, the term of this patent is extended or adjusted under 35 U.S.C. 154(b) by 65 days.

(21) Appl. No.: 15/436,594

(22) Filed: Feb. 17, 2017

(65) Prior Publication Data
US 2017/0255030 A1    Sep. 7, 2017

Related U.S. Application Data

(60) Provisional application No. 62/302,892, filed on Mar. 3, 2016.

(51) Int. Cl.
 *B29D 11/00*    (2006.01)
 *G02C 11/00*    (2006.01)
 (Continued)

(52) U.S. Cl.
 CPC ........ *G02C 11/10* (2013.01); *B29D 11/00048* (2013.01); *B29D 11/00125* (2013.01);
 (Continued)

(58) Field of Classification Search
 CPC ........ B29D 11/00125; B29D 11/00134; B29D 11/00048; B29D 11/00817; G02C 11/10; G02C 7/049; G02C 7/083; G02C 7/04
 See application file for complete search history.

(56) References Cited

U.S. PATENT DOCUMENTS 5,087,392 A * 2/1992 Burke ............... C08F 265/00
                                                    264/1.1
5,347,326 A    9/1994 Volk
    (Continued)

FOREIGN PATENT DOCUMENTS

WO    WO 2006/186573    12/2013
WO    WO 2016/076523 A1    5/2016

OTHER PUBLICATIONS

Legerton, "Smart Contact Lenses: The Future is Now," Presentation, 2013 (21 pages).
(Continued)

*Primary Examiner* — Mathieu D Vargot
(74) *Attorney, Agent, or Firm* — Christensen O'Connor Johnson Kindness PLLC (57) ABSTRACT

An eye-mountable contact lens is provided that includes electronics encapsulated within a rigid, gas-permeable polymeric material. The rigid, gas-permeable polymeric material can be mountable to a corneal surface of an eye or can be disposed on or within a flexible polymeric material that is mountable to the corneal surface of the eye. The rigid, gas-permeable polymeric material can provide structural rigidity and protection to the electronics and/or can allow for long-term dry storage of a chemical sensor of the electronics. The rigid, gas-permeable polymeric materials of the provided eye-mountable devices can be formed by curing a precursor material on or around the electronics and subsequently removing portions of the polymeric material formed by the curing, e.g., to form a rigid, gas-permeable contact lens that at least partially encapsulates the electronics and that has a curved shape that is able to be mounted to a corneal surface of an eye.

24 Claims, 5 Drawing Sheets

(51) Int. Cl.
  *G02C 7/04* (2006.01)
  *G02C 7/08* (2006.01)
  *B29K 105/00* (2006.01)

(52) U.S. Cl.
  CPC .. *B29D 11/00134* (2013.01); *B29D 11/00817* (2013.01); *G02C 7/04* (2013.01); *G02C 7/049* (2013.01); *G02C 7/083* (2013.01); *B29K 2105/0061* (2013.01)

(56) References Cited

U.S. PATENT DOCUMENTS

| | | | |
|---|---|---|---|
| 6,991,651 | B2 | 1/2006 | Portney |
| 8,513,324 | B2 | 8/2013 | Scales et al. |
| 8,673,340 | B2 | 3/2014 | Rosenthal |
| 9,044,200 | B1 | 6/2015 | Liu et al. |
| 2001/0055095 | A1* | 12/2001 | D'Souza ............ A61B 3/107 351/212 |
| 2002/0049511 | A1* | 4/2002 | Brandinger ....... A61F 9/00804 700/166 |
| 2005/0288196 | A1 | 12/2005 | Horn |
| 2006/0001184 | A1 | 1/2006 | Phelan et al. |
| 2009/0015932 | A1* | 1/2009 | Chien ............... G02B 3/0006 359/642 |
| 2010/0109175 | A1 | 5/2010 | Pugh et al. |
| 2013/0135578 | A1 | 5/2013 | Pugh et al. |
| 2014/0268019 | A1 | 9/2014 | Riall |
| 2014/0296672 | A1 | 10/2014 | Etzkorn |
| 2015/0004058 | A1 | 1/2015 | Yao et al. |
| 2015/0005602 | A1 | 1/2015 | Linhardt et al. |
| 2015/0138500 | A1 | 5/2015 | De Juan, Jr. et al. |
| 2015/0145155 | A1 | 5/2015 | Pugh et al. |
| 2015/0183173 | A1 | 7/2015 | Linhardt et al. |
| 2015/0286072 | A1 | 10/2015 | Clarke |
| 2015/0290034 | A1 | 10/2015 | Blum et al. |
| 2015/0362752 | A1 | 12/2015 | Linhardt et al. |
| 2015/0362754 | A1 | 12/2015 | Etzkorn et al. |
| 2016/0143728 | A1 | 5/2016 | De Smet et al. |

OTHER PUBLICATIONS

Tremblay et al., "Switchable Telescopic Contact Lens," Optical Express, 2013, vol. 21, No. 3 (pp. 15980-15986).
Mansouri, "The Road Ahead to Continuous 24-Hour Intraocular Pressure Monitoring in Glaucoma," Journal of Ophthalmic and Vision Research, 2014, vol. 9, No. 2 (pp. 260-268).
PCT/US2017/018971—International Search Report and Written Opinion, dated Apr. 25, 2017, 32 pages.

* cited by examiner

ELECTRONICS EMBEDDED IN RIGID GAS PERMEABLE CONTACT LENSES

CROSS-REFERENCE TO RELATED APPLICATION

This application claims the benefit of U.S. Provisional Application No. 62/302,892 filed on Mar. 3, 2016, the contents of which are incorporated herein by reference.

BACKGROUND

Unless otherwise indicated herein, the materials described in this section are not prior art to the claims in this application and are not admitted to be prior art by inclusion in this section.

A variety of physiological parameters of a human body can be detected and used to determine a health state or other information about the body (e.g., to determine a blood sugar level, to determine a blood pressure, to determine that the body is in danger from an adverse health state) and/or to perform some activities relating to the body (e.g., to inform a drug dosage, to decide a course of medical treatment, to adjust an athletic training regimen). Such physiological parameters can be detecting at a plurality of points in time and/or across an extended period of time by body-mountable devices that include sensors and other electronic components configured to measure one or more physiological parameters and/or to perform some other functions, e.g., to log and/or record measured physiological parameters, to indicate (e.g., transmit) measured physiological parameters to an external system, or to perform some other function.

Such body-mountable devices can be powered by on-board batteries, by energy transmitted from an external system (e.g., transmitted RF energy), by environmental power sources (e.g., motion of the body-mountable device, flexion of the body-mountable device), or some other power source. Such body-mountable devices could be implemented in an eye-mountable device (e.g., a contact lens) configured to measure properties of an eye and/or to otherwise interact with an eye.

SUMMARY

Some embodiments of the present disclosure provide a method including: (i) disposing an electronic apparatus on a first layer of a rigid, gas-permeable polymeric material; (ii) disposing a precursor material on the electronic apparatus and the first layer of the rigid, gas-permeable polymeric material; (iii) curing the precursor material to form a second layer of the rigid, gas-permeable polymeric material such that the electronic apparatus is at least partially embedded within the first and second layers; and (iv) forming an eye-mountable device. Forming the eye-mountable device includes removing a portion of at least one of the first and second layers of the rigid, gas-permeable polymeric material.

Some embodiments of the present disclosure provide a method including: (i) disposing an electronic apparatus within a precursor material; (ii) curing the precursor material to form a rigid, gas-permeable polymeric material such that the electronic apparatus is at least partially embedded in the rigid, gas-permeable polymeric material; (iii) forming an eye-mountable device. Forming the eye-mountable device includes removing a portion of the rigid, gas-permeable polymeric material.

Some embodiments of the present disclosure provide an eye-mountable device including: (i) an electronic apparatus; and (ii) a shaped rigid polymeric material, wherein the electronic apparatus is at least partially embedded within the shaped rigid polymeric material, and wherein the shaped rigid polymeric material comprises a rigid, gas-permeable polymer.

These as well as other aspects, advantages, and alternatives, will become apparent to those of ordinary skill in the art by reading the following detailed description, with reference where appropriate to the accompanying drawings.

DETAILED DESCRIPTION

In the following detailed description, reference is made to the accompanying figures, which form a part hereof. In the figures, similar symbols typically identify similar components, unless context dictates otherwise. The illustrative embodiments described in the detailed description, figures, and claims are not meant to be limiting. Other embodiments may be utilized, and other changes may be made, without departing from the scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

I. Overview

A contact lens or other eye-mountable device can be configured to provide an optical power to an eye (e.g., to provide an optical power that is electronically controllable), to detect properties of the eye (e.g., to detect a concentration of glucose or of some other analyte in tears of the eye), or to provide some other functionality, e.g., by including an electronic apparatus that includes one or more sensors, electronically actuated lenses, batteries, controllers, transceivers, or other electronic components. Such an eye-mountable device could be composed of a variety of materials, and an electronic apparatus could be at least partially embedded within such materials, e.g., to protect the apparatus (e.g., by providing structural rigidity), to increase the comfort of a wearer (e.g., by preventing direct contact between tissues of the eye and electronic components of the apparatus), to align the apparatus with the eye (e.g., to align an optical axis of an electronically actuated lens of the device with an optical axis of the eye), or to provide some other application.

These materials can include soft materials, e.g., hydrogels that are relatively compliant and that can deform to match the shape of the eye. Such soft materials could be used to form an eye-mountable device, e.g., to increase the comfort of a wearer to whose eye such an eye-mountable device is mounted. Additionally or alternatively, rigid materials, e.g., rigid, gas-permeable polymeric materials, could be used to form the eye-mountable device, e.g., to provide additional protection or structural rigidity to an electronic apparatus, to exert a corrective force on the eye (e.g., to reduce keratoconus), to permit long-term dry storage of the eye-mountable device (e.g., to reduce a rate of degradation of a chemical sensor of the apparatus), or according to some other consideration.

An eye-mountable device that includes an electronic apparatus (e.g., a sensor, controller, electronically actuated lens, or other components configured to provide some functionality) could be formed in a variety of ways such that the electronic apparatus is at least partially embedded within a rigid, gas-permeable polymeric material. This could include forming the electronic apparatus (e.g., a number of electronic components, a flexible substrate, elements of an actuated electronic lens) on a first sheet, disc, or other layer of rigid, gas permeable polymeric material and subsequently forming a second layer of rigid, gas permeable polymeric material by (i) disposing a precursor material on the electronic apparatus and the first layer and (ii) curing the precursor material to form a second layer of rigid, gas permeable polymeric material. The first and second layers of rigid, gas permeable polymeric material could then be machined, lathed, polished, or otherwise manipulated to form an eye-mountable device according to a specified geometry. Alternatively, an electronic apparatus (e.g., a number of electronic components disposed on a flexible substrate) could be disposed within a precursor material (e.g., by being placed within a reservoir or mold containing the precursor material) and the precursor material could be cured to form a rigid, gas permeable polymeric material within which the apparatus could be at least partially embedded. The formed rigid, gas permeable polymeric material could then be machined, lathed, polished, or otherwise manipulated to form an eye-mountable device according to a specified geometry. Other methods for forming a rigid, gas permeable polymeric material, within which an electronic apparatus is at least partially embedded, are anticipated.

The shape of the formed rigid, gas permeable polymeric material of an eye-mountable device as described herein could be specified such that the rigid, gas permeable polymeric material can be comfortably mounted to an eye. That is, the rigid, gas permeable polymeric material could have concave and convex surfaces formed such that the eye-mountable device can be mounted to the cornea of an eye and such that such mounting s compatible with eyelid motion of the eye. In another example, an eye-mountable device could include a soft polymeric material (e.g., a hydrogel) that is configured to be mounted, in combination with a rigid, gas permeable polymeric material within which an electronic apparatus is at least partially embedded, to an eye, e.g., to increase the comfort of such mounting or according to some other consideration. The soft polymeric material could be formed around the rigid, gas permeable polymeric material (e.g., by molding, machining, lathing, or other processes). Additionally or alternatively, the soft polymeric material could be formed separately from the rigid, gas permeable polymeric material and the two elements of an eye-mountable device could be combined (e.g., by a wearer before mounting the combined elements to an eye of the wearer).

Eye-mountable devices are described herein that include an electronic apparatus at least partially embedded within a rigid, gas permeable polymeric material. This could include the rigid, gas permeable polymeric material completely enclosing the electronic apparatus. Alternatively, one or more windows or other features could be formed in the rigid, gas permeable polymeric material to provide access to a portion of the electronic apparatus. For example, one or more windows could be formed in a rigid, gas permeable polymeric material to provide access between a fluid or tissue of a body (e.g., to a tear fluid of an eye to which the eye-mountable device is mounted) and a sensor, an electrode, an electrochemical battery, or some other component(s) of the electronic apparatus. Such windows (or other features) could be formed by removing a portion of a formed rigid, gas permeable polymeric material (e.g., using a laser, a lathe, a drill, or some other means for removing polymeric material). Additionally or alternatively, such windows could be formed by a feature of a mold within which the rigid, gas permeable polymeric material is formed and/or by forming a sacrificial plug or other sacrificial material to displace a precursor material and later removing such a sacrificial element.

II. Example Eye-Mountable Device

An eye-mountable device that includes an electronic apparatus (e.g., one or more sensors, controllers, batteries, antennas, or other elements) that is at least partially embedded within a rigid, gas permeable polymeric material (e.g., to provide protection and/or structure to the electronic apparatus, to provide an overall shape or external mounting surface of the eye-mountable device) can be configured and/or operated in a variety of ways according to an application. Such applications could include detecting one or more physiological parameters or other variables of interest using one or more sensors of the electronic apparatus (e.g., to detect a concentration of glucose in tear fluid of an eye, to detect a wink or blink of an eyelid), providing a controllable optical power to an eye (e.g., by controlling the optical power of an electronically actuated lens of the electronic apparatus), providing power to one or more devices implanted within an eye, acting as a communications bridge for one or more devices implanted within an eye, or some other applications. An element of rigid, gas permeable polymeric material within which an electronic apparatus is at least partially embedded could be formed to be removably mounted directly to an eye in a manner that is compatible with eyelid motion (e.g., the rigid, gas permeable polymeric material could be formed as a rigid contact lens). Alternatively, such a rigid, gas permeable polymeric material could be formed within an encapsulating material (e.g., within a hydrogel or other sot polymeric material formed to mount to an eye) and/or could be formed to mount to or within a soft polymeric material that is configured to mount to an eye in combination with the rigid, gas permeable polymeric material.

Figure 1A:
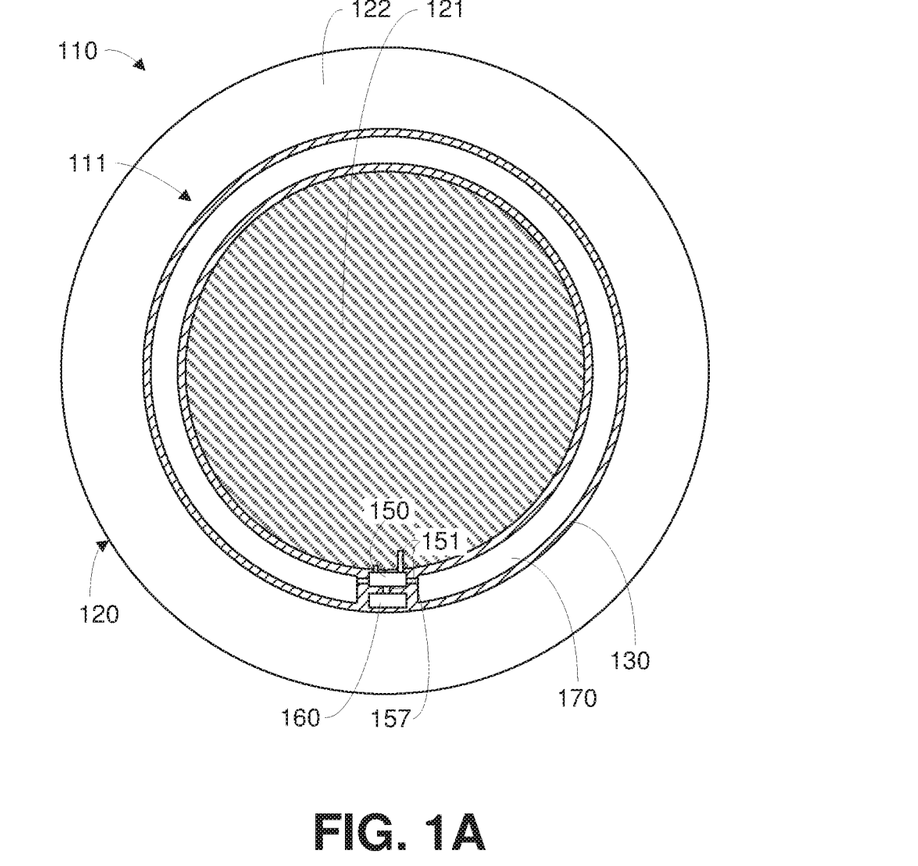
FIG. 1A is a top view of an example eye-mountable device.
Figure 1B:
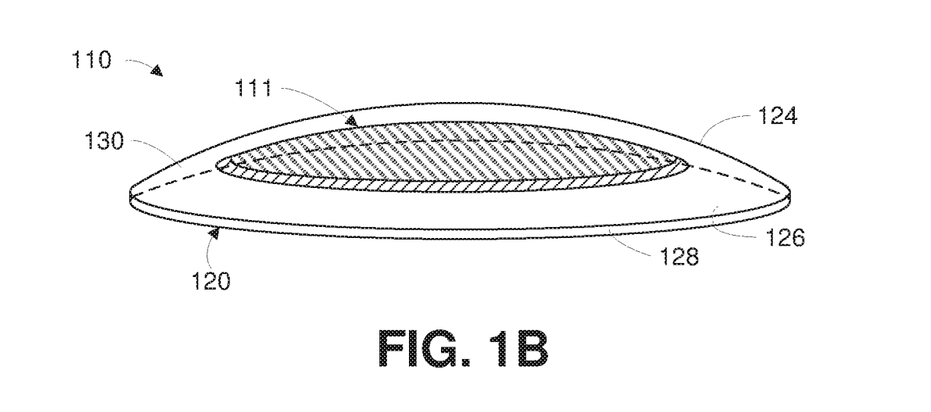
FIG. 1B is an aspect view of the example eye-mountable device shown in FIG. 1A.

FIG. 1A is a top view of an example eye-mountable electronic device 110. FIG. 1B is an aspect view of the example eye-mountable electronic device shown in FIG. 1A. It is noted that relative dimensions in FIGS. 1A and 1B are not necessarily to scale, but have been rendered for purposes of explanation only in describing the arrangement of the example eye-mountable electronic device 110. The eye-mountable device 110 is formed of a rigid, gas permeable polymeric material 120 shaped as a curved disk. The rigid, gas permeable polymeric material 120 can be a substantially transparent material to allow incident light to be transmitted to the eye while the eye-mountable device 110 is mounted to the eye. The rigid, gas permeable polymeric material 120 can be a biocompatible, oxygen-permeable material similar to those employed to form rigid vision correction and/or cosmetic contact lenses in optometry, such as silicone acrylate, fluoro-silicone acrylate, or other rigid, gas-permeable polymers. The rigid, gas permeable polymeric material 120 could include further compounds or materials to provide some functionality, e.g., to block ultraviolet light from being transmitted, through the eye-mountable device 110, to an eye. Further, the rigid, gas permeable polymeric material 120 could include a surface coating configured to provide some functionality, e.g., a hydrophilic coating or some other coating to increase wetting and/or comfort.

The rigid, gas permeable polymeric material 120 can be formed with one side having a concave surface 126 suitable to fit over a corneal surface of an eye. The opposing side of the disk can have a convex surface 124 that does not interfere with eyelid motion while the eye-mountable device 110 is mounted to the eye. A circular outer side edge 128 connects the concave surface 124 and convex surface 126. The eye-mountable device 110 can have dimensions similar to a vision correction and/or cosmetic contact lenses, such as a diameter of approximately 1 centimeter, and a thickness of about 0.1 to about 0.5 millimeters. However, the diameter and thickness values are provided for explanatory purposes only. In some embodiments, the dimensions of the eye-mountable device 110 can be selected according to the size and/or shape of the corneal surface of the wearer's eye. The shape of the eye-mountable device 110 can be specified with a curvature, astigmatism, or other properties to provide a specified optical power to an eye. Additionally or alternatively, the shape of the eye-mountable device 110 could be specified to apply a force to a cornea of an eye to which the eye-mountable device 110 is mounted, e.g., to correct keratoconus or according to some other application.

The polymeric material 120 can be formed with a curved shape in a variety of ways. For example, techniques similar to those employed to form rigid vision-correction contact lenses can be employed to form the polymeric material 120. These methods can include molding, machining, lathing, polishing, or other processes. While the eye-mountable device 110 is mounted in an eye, the convex surface 124 faces outward to the ambient environment while the concave surface 126 faces inward, toward the corneal surface. The convex surface 124 can therefore be considered an outer, top surface of the eye-mountable device 110 whereas the concave surface 126 can be considered an inner, bottom surface. The "top" view shown in FIG. 1A is facing the convex surface 124. From the top view shown in FIG. 1A, the outer periphery 122, near the outer circumference of the curved disk is curved into the page, whereas the center region 121, near the center of the disk is curved out of the page.

Figure 1C:
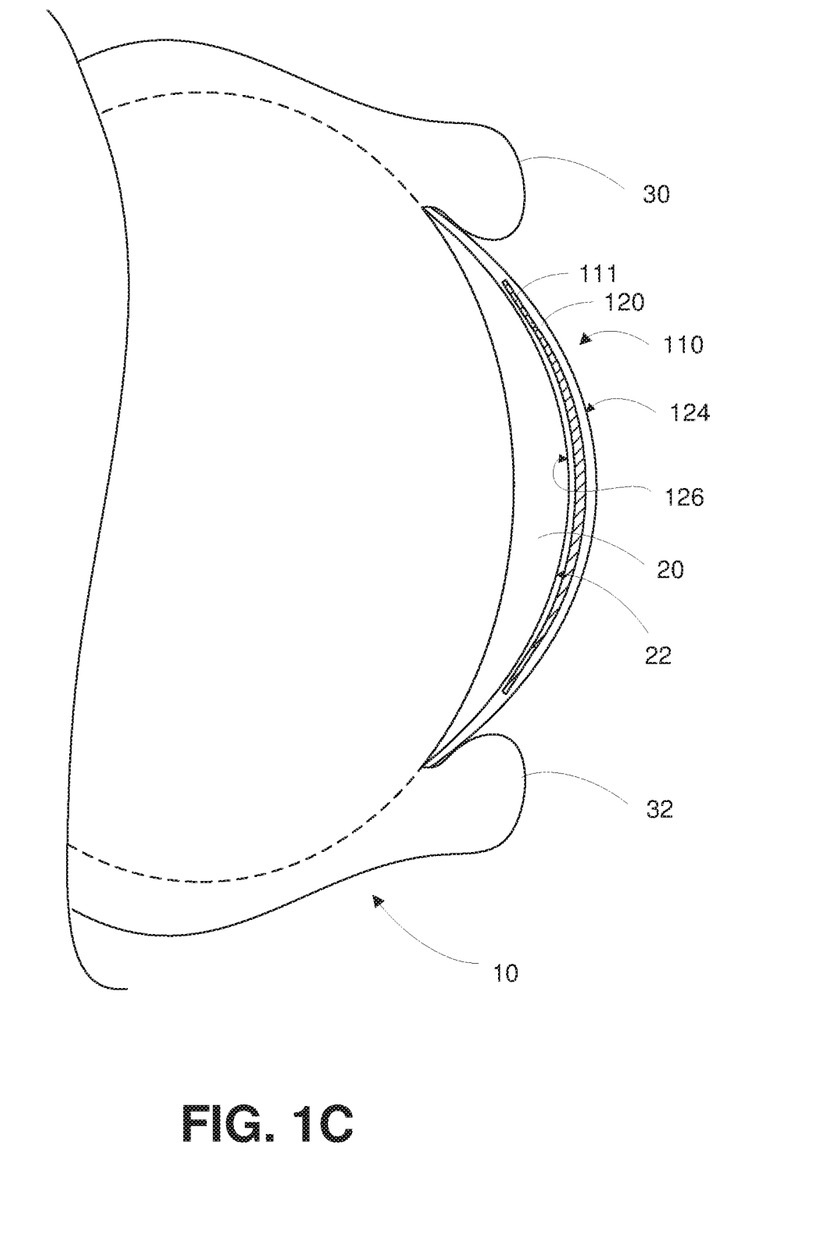
FIG. 1C is a side cross-section view of the example eye-mountable device shown in FIGS. 1A and 1B while mounted to a corneal surface of an eye.

An electronic apparatus 111 is embedded within the rigid, gas permeable polymeric material 120. As shown in FIGS. 1A-C, the electronic apparatus 111 is fully embedded within the rigid, gas permeable polymeric material 120; that is, the rigid, gas permeable polymeric material completely surrounds the electronic apparatus 111 such that no aspect or element of the electronic apparatus 111 is exposed to an environment of the eye-mountable device 110 (e.g., to a tear fluid of an eye to which the eye-mountable device 110 is mounted). However, this is intended as a non-limiting example embodiment; in other embodiments, one or more windows, channels, or other features could be formed in a rigid, gas permeable polymeric material such that an electronic apparatus is partially embedded within a rigid, gas permeable polymeric material. Such windows, channels, or other features could be provided such that sensors, batteries, electrodes, or other elements of an electronic apparatus can access a tear fluid or other fluids or tissues of an eye.

The electronic apparatus 111 includes a central electronically actuated lens 121 surrounded by a substrate 130. The electronically actuated lens 121 and substrate 130 can be embedded such that the substrate 130 is situated along the outer periphery 122 of the rigid, gas permeable polymeric material 120, away from the center region 121. The substrate 130 does not interfere with vision because it is too close to the eye to be in focus and is positioned away from the center region 121 where incident light is transmitted, through the electronically actuated lens 121, to the light-sensing portions of the eye. Moreover, the substrate 130 can be formed of a transparent material to further mitigate any effects on visual perception.

The electronically actuated lens 121 is configured such that a voltage, current, or other property of an electrical signal applied to the electronically actuated lens 121 can be controlled to control the optical power of the electronically actuated lens 121. In some examples, this could include applying a voltage across a layer of liquid crystal of the electronically actuated lens 121 to, e.g., control a refractive index of the liquid crystal. The electronically actuated lens 121 could include additionally elements, e.g., electrodes to apply a voltage or current to a liquid crystal or other element of the electronically actuated lens 121, one or more layers of material configured to contain and/or provide structure to other elements of the electronically actuated lens 121 (e.g., one or more rigid layers that contain a liquid crystal and that include a texture configure to align the liquid crystal relative to the rigid layers), or other components. In some examples, the electronically actuated lens 121 could include one or more elements (e.g., one or more textured, rigid layers on which electrodes are disposed) composed of a rigid, gas permeable polymeric material.

The substrate 130 can be shaped as a flat, circular ring (e.g., a disk with a central hole). The flat surface of the substrate 130 (e.g., along the radial width) is a platform for mounting electronics such as chips (e.g., via flip-chip mounting) and for patterning conductive materials (e.g., via deposition techniques) to form electrodes (e.g., an anode and/or cathode of an electrochemical battery, electrodes of an electrochemical sensor, contact electrodes for electrically contacting with leads of the electronically actuated lens 121), antenna(e), and/or connections. The substrate 130, electronically actuated lens 121, and the rigid, gas permeable polymeric material 120 can be approximately cylindrically symmetric about a common central axis. The substrate 130 can have, for example, a diameter of about 10 millimeters, a radial width of about 1 millimeter (e.g., an outer radius 1 millimeter greater than an inner radius), and a thickness of about 50 micrometers. However, these dimensions are provided for example purposes only, and in no way limit the present disclosure. The substrate 130 can be implemented in a variety of different form factors.

A loop antenna 170, controller 150, and sensor 160 are disposed on the embedded substrate 130. The controller 150 can be a chip including logic elements configured to receive power from the loop antenna 170 and to operate the loop antenna 170, sensor 160, and electronically actuated lens 121. The controller 150 is electrically connected to the loop antenna 170, sensor 160, and electronically actuated lens 121 (e.g., to conductive leads or electrodes of the electronically actuated lens 121) by interconnects 151 also situated on the substrate 130. The interconnects 151, the loop antenna 170, and any conductive electrodes (e.g., an anode and cathode of an electrochemical battery, for an electrochemical ion sensor, etc.) can be formed from conductive materials patterned on the substrate 130 by a process for precisely patterning such materials, such as deposition, lithography, etc. The conductive materials patterned on the substrate 130 can be, for example, gold, platinum, palladium, titanium, carbon, aluminum, copper, silver, silver-chloride, conductors formed from noble materials, metals, combinations of these, etc.

The sensor 160 could include a variety of components configured to detect physiological parameters of a body (e.g., concentrations of analytes in tears or other bodily fluids, an amount of blood in a portion of subsurface vasculature, an oxygenation state of blood, whether an eyelid is closed), properties of the environment of the device (e.g., an ambient illumination, a barometric pressure, a temperature), properties of the device (e.g., an acceleration, an orientation), or to detect some other information. Such sensors could include accelerometers, electrodes (e.g., electrodes of an electrochemical analyte sensors, electrodes of an electrophysiological sensor configured to detect an electrooculogram, an electromyogram, or some other bioelectrical signal), light detectors, thermometers, gyroscopes, capacitance sensors, pressure sensors, strain gauges, light emitters, microphones, or other elements configured to detect one or more physical variables related to a property of interest.

As shown in FIG. 1A, which is a view facing the convex surface 124 of the eye-mountable device 110, the sensor 160 is mounted to a side of the substrate 130 facing the convex surface 124. However, the electronics, sensor, etc. situated on the substrate 130 can be mounted to either the "inward" facing side (e.g., situated closest to the concave surface 126) or the "outward" facing side (e.g., situated closest to the convex surface 124). Moreover, in some embodiments, some electronic components can be mounted on one side of the substrate 130, while other electronic components are mounted to the opposing side, and connections between the two can be made via conductive materials passing through the substrate 130.

The loop antenna 170 can be a layer of conductive material patterned along the flat surface of the substrate to form a flat conductive ring. In some instances, the loop antenna 170 can be formed without making a complete loop. For instance, the antenna 170 can have a cutout to allow room for the controller 150 and sensor 160, as illustrated in FIG. 1A. However, the loop antenna 170 can also be arranged as a continuous strip of conductive material that wraps entirely around the flat surface of the substrate 130 one or more times. For example, a strip of conductive material with multiple windings can be patterned on the side of the substrate 130 opposite the controller 150 and sensor 160. Interconnects between the ends of such a wound antenna (e.g., the antenna leads) can be passed through the substrate 130 to the controller 150.

FIG. 1C is a side cross-section view of the example eye-mountable electronic device 110 while mounted to a corneal surface 22 of an eye 10. It is noted that relative dimensions in FIG. 1C are not necessarily to scale, but have been rendered for purposes of explanation only in describing the arrangement of the example eye-mountable electronic device 110. Some aspects are exaggerated to allow for illustration and to facilitate explanation.

The eye 10 includes a cornea 20 that is covered by bringing the upper eyelid 30 and lower eyelid 32 together over the top of the eye 10. Incident light is received by the eye 10 through the electronically actuated lens 121, the rigid, gas permeable polymeric material, and the cornea 20, where light is optically directed to light sensing elements of the eye 10 (e.g., rods and cones, etc.) to stimulate visual perception. The motion of the eyelids 30, 32 distributes a tear film across the exposed corneal surface 22 of the eye 10. The tear film is an aqueous fluid secreted by the lacrimal gland to protect and lubricate the eye 10. When the eye-mountable device 110 is mounted in the eye 10, the tear film coats both the concave and convex surfaces 124, 126 with an inner layer (along the concave surface 126) and an outer layer (along the convex layer 124). The tear film layers can be about 10 micrometers in thickness and together account for about 10 microliters.

The tear film layers are distributed across the corneal surface 22 and/or the convex surface 124 by motion of the eyelids 30, 32. For example, the eyelids 30, 32 raise and lower, respectively, to spread a small volume of tear film across the corneal surface 22 and/or the convex surface 124 of the eye-mountable device 110. The tear film layer on the corneal surface 22 also facilitates mounting the eye-mountable device 110 by capillary forces between the concave surface 126 and the corneal surface 22. In some embodiments, the eye-mountable device 110 can also be held over the eye in part by vacuum forces against corneal surface 22 due to the concave curvature of the eye-facing concave surface 126.

Note that the eye-mountable device 110 illustrated in FIGS. 1A-C is intended as a non-limiting example embodiment. An eye-mountable device that includes an electronic apparatus at least partially embedded within a rigid, gas permeable polymeric material could include additional or alternative elements to those shown in FIGS. 1A-C, or could lack some of the elements shown in FIGS. 1A-C. For example, such an eye-mountable device could lack an electronically actuated lens. Further, while the electronic apparatus 111 shown in FIGS. 1A-C is fully embedded within the rigid, gas permeable polymeric material 120, an eye-mountable device as described herein could include an electronic apparatus that is only partially embedded within a rigid, gas permeable polymeric material. For example, one or more channels, windows, or other features could be formed in such a rigid, gas permeable polymeric material could expose electrodes, sensors, or other elements of such a partially embedded electronic apparatus to an environment of such an eye-mountable device.

Still further, while the eye-mountable device 110 illustrated in FIGS. 1A-C includes a rigid, gas permeable polymeric material 120 that is formed to mount directly to an eye, an eye-mountable device could further include other elements configured to facilitate mounting of the eye-mountable device to an eye. For example, a rigid, gas permeable polymeric material, within which is at least partially embedded an electronic apparatus, could itself be wholly or partially embedded within a shaped soft polymeric material (e.g., a silicone hydrogel). Such a shaped soft polymeric material could be provided to increase the comfort of a wearer of such an eye-mountable device, to increase a biocompatibility of such an eye-mountable device, or to provide some other functionality. In some examples, such a soft polymeric material could be formed around a rigid, gas permeable polymeric material within which is disposed an electronic apparatus. In a particular example, an electronic apparatus that includes an electronically actuated lens could be fully embedded within a rigid, gas permeable polymeric material and the rigid, gas permeable polymeric material could be fully embedded within a soft polymeric material.

Alternatively, a rigid, gas permeable polymeric material, within which is partially embedded an electronic apparatus, could be shaped such that the rigid, gas permeable polymeric material can be mounted on or within a shaped soft polymeric material such that the combination of the rigid, gas permeable polymeric material and the soft polymeric material can be removably mounted to an eye in a manner that is compatible with eyelid motion. The soft polymeric material and the rigid, gas permeable polymeric material could be configured in this way to permit reuse of the rigid, gas permeable polymeric material and electronic apparatus, to permit dry storage of the rigid, gas permeable polymeric material and electronic apparatus (e.g., to reduce a rate of degradation of a chemical sensor of the electronic apparatus), or to provide some other benefit.

The rigid, gas permeable polymeric material could be configured to be mounted on or within the soft polymeric material in a variety of ways, e.g., via capillary forces, via an adhesive, via formed prongs, clips, ridges, or other formed elements in one or both of the soft polymeric material and/or the rigid polymeric material, or using some other means to mount the rigid, gas permeable polymeric material on or within the soft polymeric material. The rigid, gas permeable polymeric material and soft polymeric material could be configured such that, when the rigid, gas permeable polymeric material is mounted to the soft polymeric material, the rigid, gas permeable polymeric material is fully embedded within the soft polymeric material or such that the rigid, gas permeable polymeric material is only partially embedded within the soft polymeric material (e.g., such that an outer surface of the rigid, gas permeable polymeric material is in contact with a corneal surface or an inner eyelid surface of an eye when the rigid, gas permeable polymeric material is mounted to the soft polymeric material and the combination of the rigid polymeric material and the soft polymeric material is mounted to the eye).

Figure 2A:
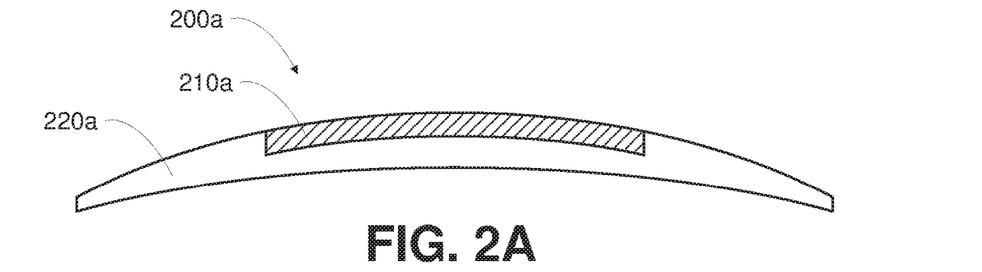
FIG. 2A is a side cross-section view of an eye-mountable device.

FIG. 2A shows an example eye-mountable device 200*a* that includes a shaped rigid, gas permeable polymeric material 210*a* mounted to a shaped soft polymeric material 220*a*. An electronic apparatus (not shown) is at least partially embedded within the shaped rigid, gas permeable polymeric material 210*a*. The electronic apparatus can include, for example, one or more controllers, interconnects, transceivers, antennas, electrodes, sensors, electronically actuated lenses, batteries, interconnects, or other elements. When the shaped rigid, gas permeable polymeric material 210*a* is mounted to the shaped soft polymeric material 220*a* as shown in FIG. 2A, the shaped rigid, gas permeable polymeric material 210*a* is partially embedded within the shaped soft polymeric material 220*a*. The shaped rigid, gas permeable polymeric material 210*a* could be secured to the shaped soft polymeric material 220*a* by capillary forces exerted by a fluid (e.g., a tear fluid, a saline fluid, a lubricant) disposed between the rigid material 210*a* and the soft material 220*a*, by an adhesive disposed between the rigid material 210*a* and the soft material 220*a*, by Van der Waals forces between the rigid material 210*a* and the soft material 220*a*, or by some other forces between the rigid material 210*a* and the soft material 220*a*. Such forces could be increased by forming the rigid material 210*a* and the soft material 220*a* to have complimentary textures, prongs, pits, pins, ridges, or other formed features. Such formed features could additionally act to align the rigid material 210*a* relative to the soft material 220*a*

Figure 2B:
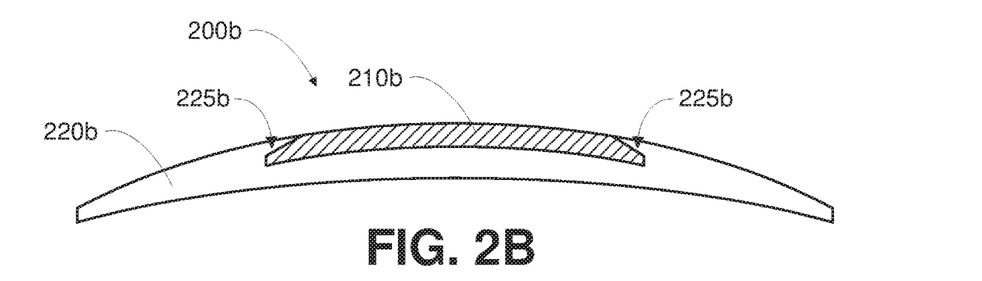
FIG. 2B is a side cross-section view of an eye-mountable device.

Such rigid, gas permeable polymeric materials and soft polymeric materials could further include clips, ridges, or other means configured to exert a mechanical force to secure such rigid, gas permeable polymeric materials and such soft polymeric materials together. FIG. 2B shows an example eye-mountable device 200*b* that includes a shaped rigid, gas permeable polymeric material 210*b* mounted to a shaped soft polymeric material 220*b*. An electronic apparatus (not shown) is at least partially embedded within the shaped rigid, gas permeable polymeric material 210*b*. When the shaped rigid, gas permeable polymeric material 210*b* is mounted to the shaped soft polymeric material 220*b* as shown in FIG. 2B, the shaped rigid, gas permeable polymeric material 210*b* is partially embedded within the shaped soft polymeric material 220*a*. Further, the shaped rigid, gas permeable polymeric material 210*b* is secured to the shaped soft polymeric material 220*b* by formed projections 225 (e.g., 'clips') of the shaped polymeric material 220*b*. The shaped soft polymeric material 220*b* could be radially symmetric, such that the formed projections 225*b* comprise a single circular projection. In such an example, the shaped rigid, gas permeable polymeric material could be mounted to the shaped soft polymeric material 220*b* by elastically deforming (e.g., bending, stretching) the shaped soft polymeric material 220*b*.

Figure 2C:
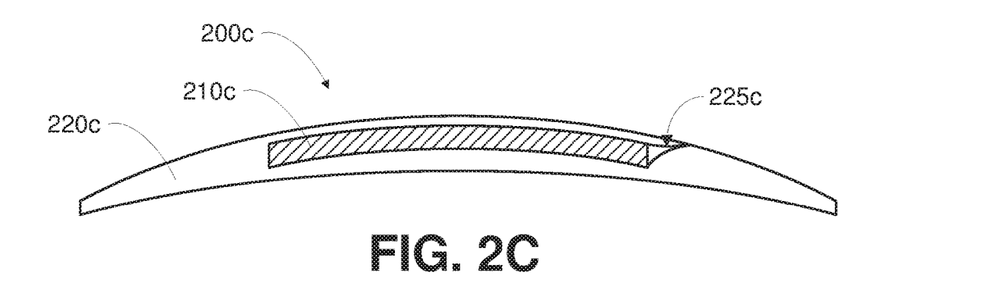
FIG. 2C is a side cross-section view of an eye-mountable device.

In some examples, a shaped rigid, gas permeable polymeric material could be configured to mount within a shaped soft polymeric material such that the shaped rigid, gas permeable polymeric material is fully embedded within the shaped soft polymeric material. This could include forming the shaped soft polymeric material to include a pocket, pouch, or other enclosed volume into which the shaped rigid polymeric material could be inserted. FIG. 2C shows an example eye-mountable device 200*c* that includes a shaped rigid, gas permeable polymeric material 210*c* mounted within a shaped soft polymeric material 220*c*. An electronic apparatus (e.g., one or more controllers, interconnects, transceivers, antennas, electrodes, sensors, electronically actuated lenses, batteries, interconnects, or other elements) is at least partially embedded within the shaped rigid, gas permeable polymeric material 210*c* (not shown). When the shaped rigid, gas permeable polymeric material 210*c* is mounted within the shaped soft polymeric material 220*c* as shown in FIG. 2C, the shaped rigid, gas permeable polymeric material 210*c* is fully embedded within an enclosed volume of the shaped soft polymeric material 220*c*. Such mounting can include inserting the shaped rigid, gas permeable polymeric material 210c into the enclosed volume of the shaped soft polymeric material 220c via a channel 225c formed in the shaped soft polymeric material 220a to provide access to the enclosed volume from outside of the shaped soft polymeric material 220a.

Figure 2D:
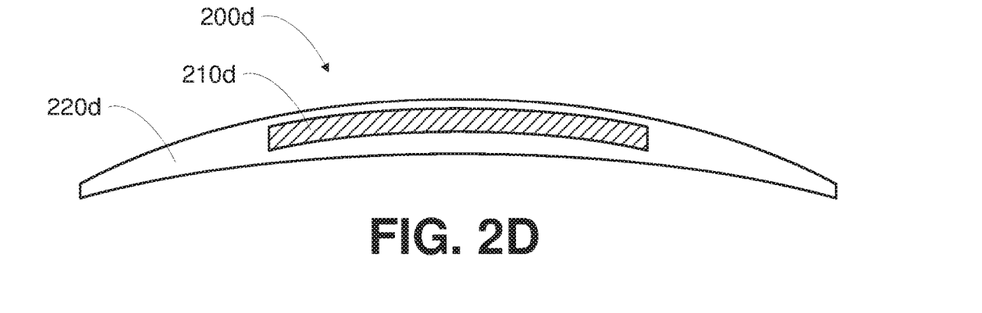
FIG. 2D is a side cross-section view of an eye-mountable device.

Alternatively, a shaped soft polymeric material could be formed around a shaped rigid, gas permeable polymeric material such that the shaped rigid, gas permeable polymeric material is fully embedded within the shaped soft polymeric material. This could include forming the shaped soft polymeric via injection molding, machining, polishing, or other fabrications steps or methods such that the formed soft polymeric material fully encloses the rigid polymeric material. FIG. 2d shows an example eye-mountable device 200d that includes a shaped rigid, gas permeable polymeric material 210d disposed within a shaped soft polymeric material 220d. An electronic apparatus (e.g., one or more controllers, interconnects, transceivers, antennas, electrodes, sensors, electronically actuated lenses, batteries, interconnects, or other elements) is at least partially embedded within the shaped rigid, gas permeable polymeric material 210d (not shown). As shown in FIG. 2C, the shaped soft polymeric material 220c has been formed around the shaped rigid, gas permeable polymeric material 210c such that the shaped rigid, gas permeable polymeric material 210c is fully embedded within the shaped soft polymeric material 220c.

The eye-mountable devices as shown herein (e.g., 100, 200a, 200b, 200c, 200d) could include one or more sensors configured to detect physiological parameters of a body (e.g., concentrations of analytes in tears or other bodily fluids, an amount of blood in a portion of subsurface vasculature, an oxygenation state of blood, whether an eyelid is closed), properties of the environment of the device (e.g., an ambient illumination, a barometric pressure, a temperature), properties of the device (e.g., an acceleration, an orientation), or to detect some other information. Such sensors could include accelerometers, electrodes (e.g., electrodes of an electrochemical analyte sensors, electrodes of an electrophysiological sensor configured to detect an electrooculogram, an electromyogram, or some other bioelectrical signal), light detectors, thermometers, gyroscopes, capacitance sensors, pressure sensors, strain gauges, light emitters, microphones, or other elements configured to detect one or more physical variables related to a property of interest. The eye-mountable devices as shown here could operate such elements to measure physiological parameters or other information of interest at one or more points in time using power provided by an electrochemical battery and/or power provided by some other source (e.g., RF power provided by an external system via an antenna of an eye-mountable device). Such measured properties and/or parameters could be recorded (e.g., in a memory of the device, for example, for later transmission to an external system), transmitted to an external system, indicated using elements of the device (e.g., using a display, using one or more light-emitting elements), used to determine a health state of a user, or used according to some other application.

III. Example Fabrication of Eye-Mountable Devices

Eye-mountable devices that include an electronic apparatus at least partially embedded within a shaped rigid, gas permeable polymeric material as described herein may be fabricated in a variety of ways. In some examples, this could include disposing a precursor material on the electronic apparatus or disposing the electronic apparatus within such a precursor material and curing the precursor material to form a rigid, gas permeable polymeric material. Such a formed rigid, gas permeable polymeric material can then be lathed, polished, or otherwise machined to remove portions of the formed rigid, gas permeable polymeric material to shape the rigid, gas permeable polymeric material according to an application. This could include shaping the formed rigid, gas permeable polymeric material such that the rigid, gas permeable polymeric material can be mounted to an eye, such that the formed rigid, gas permeable polymeric material can be mounted on or within a shaped soft polymeric material, such that the formed rigid, gas permeable polymeric material includes one or more channels, windows, or other features to exposed elements (e.g., sensors) of the electronic apparatus, or such the that formed rigid, gas permeable polymeric material has some other shape or feature(s). This shaping could include multiple steps, e.g., a first machining step that is specified (e.g., based on images or other data about the location and/or orientation of the electronic apparatus within the formed rigid, gas permeable polymeric material)

Disposition of precursor material on an electronic apparatus and/or disposition of an electronic apparatus within such a precursor material, followed by curing of the precursor material, may be performed a number of times (e.g., to form a respective number of layers of rigid, gas permeable polymeric material) to form a single, continuous element of rigid, gas permeable polymeric material within which an electronic apparatus is at least partially embedded. Further, the curing of precursor material could occur while the precursor material and electronic apparatus at contained within a mold or other shaped container. Such a mold or other shaped container could be configured such that the rigid, gas permeable polymeric material formed by curing the precursor material has a specified shape. Such a specified shape could facilitate alignment of the electronic apparatus within the formed rigid, gas permeable polymeric material relative to a lathe or other machining means.

FIGS. 3A through 3G illustrate steps in an example process of fabricating an eye-mountable device that includes an electronic apparatus that is at least partially embedded within a rigid, gas permeable polymeric material as described herein. The process begins in FIG. 3A, which illustrates an electronic apparatus 310 that has been formed and that may be incorporated into a rigid, gas permeable polymeric material. The electronic apparatus 310 may include a variety of components (e.g., an electronically actuated lens, a controller, a loop antenna, a flexible substrate on which other components are formed/disposed, interconnects, a sensor, a battery) formed by a variety of processes or methods. For example, the electronic apparatus 310 may include a substrate on which a variety of components are disposed and/or formed (e.g., interconnects, sensor electrodes, antennas, or other metallic structures may be formed on the substrate by photo-patterning or other methods for controlling a pattern of conductive material on a substrate). The electronic apparatus 310 may include elements composed of a rigid, gas permeable polymeric material, e.g., lenses or other sheets or layers of material formed into an electronically actuated lens.

Figure 3A:
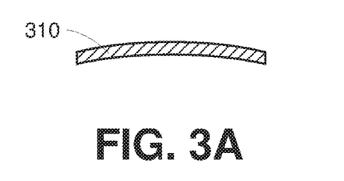
FIG. 3A illustrates elements of an eye-mountable device during fabrication of the eye-mountable device.
Figure 3B:
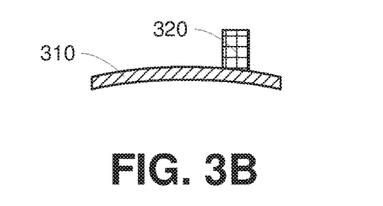
FIG. 3B illustrates elements of an eye-mountable device during fabrication of the eye-mountable device.

FIG. 3B illustrates the addition of a sacrificial plug 320 disposed at a location on the electronic apparatus 310. The sacrificial plug could be disposed on a sensor, an electrode, or some other element(s) of the electronic apparatus whose operation is related to exposure to an environment of an eye-mountable device formed through the processes described herein. The sacrificial plug 320 can act to prevent rigid, gas permeable polymeric material from being formed, in later steps of the fabrication process illustrated in FIGS.

3A-G, over the element(s) of the electronic apparatus 310 such that those element(s) are exposed (e.g., to tear fluid or some other fluid or tissue in an environment of an eye-mountable device formed by a process that includes the steps illustrated in FIGS. 3A-G) and such that the electronic apparatus 310 is partially embedded (rather than fully embedded) within a rigid, gas permeable polymeric material. The sacrificial plug 320 could be composed of polylactic acid, polyethylene glycol, or some other material that can displace a precursor material while the precursor material is cured into a rigid, gas permeable polymeric material and that can subsequently be removed, e.g., by machining, dissolution, chemical decomposition, or some other processes such that a window is formed, through the rigid, gas permeable polymeric material, at the former location of the sacrificial plug 320 relative to the electronic apparatus 310. The sacrificial plug 320 could be formed on the electronic apparatus 310 by one or more processes used to dispose and/or pattern a material, e.g., via one or more of spin-coating, inkjet printing, photo-patterning, or some other process(es).

Figure 3C:
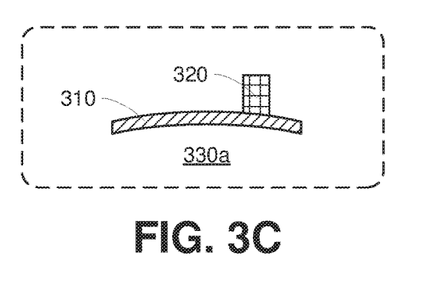
FIG. 3C illustrates elements of an eye-mountable device during fabrication of the eye-mountable device.

FIG. 3C illustrates the disposition of a precursor material 330a on the electronic apparatus 310 and sacrificial plug 320. As shown in FIG. 3C, this includes disposing the electronic apparatus 310 and sacrificial plug 320 within a volume of the precursor material 330a. The precursor material 330a includes one or more monomers or other compounds or substances that can be cured to form a rigid, gas permeable polymeric material (e.g., to form a silicone acrylate material). The precursor material 330a may additionally include polymerization initiators (e.g., substances that generate free radicals in response to exposure to ultraviolet light), linking elements configured to result in branching and/or crosslinking between polymer chains formed from the precursor material 330a, substances configured to block ultraviolet light from being transmitted through the formed rigid, gas permeable polymeric material, hardening agents, agents that facilitate transport of oxygen through the formed rigid, gas permeable polymeric material (e.g., by facilitating the formation of channels or other structure within the formed rigid, gas permeable polymeric material), or other substances according to an application.

In some examples, the precursor material 330a could be sufficiently viscous and/or the electronic apparatus 310 and sacrificial plug 320 could be sufficiently light that the electronic apparatus 310 and sacrificial plug 320 are supported within the precursor material 330a without supports. In such examples, this could include partially filling a mold with the precursor material 330a, disposing the electronic apparatus 310 (and any elements disposed thereon, e.g., the sacrificial plug 320) within the mold on the surface of the precursor material 330a, and then disposing an additional amount of precursor material 330a within the mold. Additionally or alternatively, the electronic apparatus 310 could be maintained at a location within the precursor material 330a by a number of supports (e.g., by one or more supports composed of a rigid, gas permeable polymeric material and/or one or more supports composed of a sacrificial material that may later be removed to expose corresponding elements of the electronic apparatus 310). Disposing the precursor material 330a on the electronic apparatus 310 and sacrificial plug 320 could additionally include steps for removing and/or minimizing air bubbles within the precursor material 330a, e.g., by exposing the precursor material 330a to a high pressure or a low pressure, by stirring the precursor material 330a, and/or by exposing the precursor material 330a to ultrasonic vibrations.

Figure 3D:
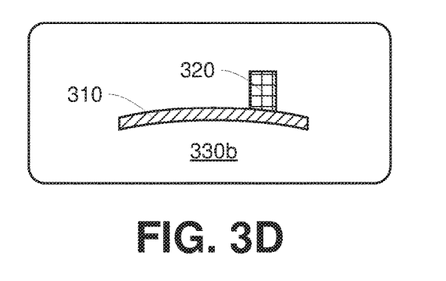
FIG. 3D illustrates elements of an eye-mountable device during fabrication of the eye-mountable device.

FIG. 3D illustrates the curing of the precursor material 330a to form a rigid, gas permeable polymeric material 330b. Curing the precursor material 330a could include exposing the precursor material 330a to heat, pressure, light (e.g., ultraviolet light), chemicals, an atmosphere having a specified property (e.g., an atmosphere that is low in humidity), or to some other factors or substances to cause and/or accelerate the formation of the rigid, gas permeable polymeric material 3D from the precursor material 330a. Additionally or alternatively, the precursor material 330a could be configured to cure over time without any particular triggering agent (e.g., the precursor material 330a could include a two-part mixture of substances that, when mixed, act to form the rigid, gas permeable polymeric material 330b); in such examples, curing the precursor material 330a could include allowing the precursor material 330a to cure for a specified period of time.

An eye-mountable device can then be formed by removing a portion of the formed rigid, gas permeable polymeric material 330b. This can include polishing, lathing, or otherwise machining the formed rigid, gas permeable polymeric material 330b to form a specified shape. Such a specified shape could be specified to permit mounting of the formed rigid, gas permeable polymeric material to a corneal surface of an eye. Additionally or alternatively, such a specified shape could be specified to permit mounting of the formed rigid, gas permeable polymeric material within a soft polymeric material and/or to permit the formation of such a soft polymeric material on or around the formed rigid, gas permeable polymeric material.

Figure 3E:
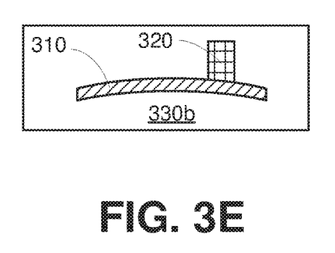
FIG. 3E illustrates elements of an eye-mountable device during fabrication of the eye-mountable device.

In some examples, removing a portion of the formed rigid, gas permeable polymeric material 330b could include a multi-step process wherein a first portion of the formed rigid, gas permeable polymeric material 330b is removed to form a first shape of the rigid, gas permeable polymeric material 330b such that the electronic apparatus 310 (e.g., to align an electronically actuated lens of the electronic apparatus 310) is aligned with the first shape of the rigid, gas permeable polymeric material 330b. This is illustrated in FIG. 3E, wherein a portion of the formed rigid, gas permeable polymeric material 330b has been removed to center the electronic apparatus 310 within the first shape of the rigid, gas permeable polymeric material 330b. Such removal can be accomplished by lathing, polishing, or otherwise machining the formed rigid, gas permeable polymeric material 330b using a laser, a drill, a saw, or some other means. Such removal could be performed based on information (e.g., images of the electronic apparatus 310 and the formed rigid, gas permeable polymeric material 330b) about the location and/or orientation of the electronic apparatus 310 within the formed rigid, gas permeable polymeric material 330b. Additionally or alternatively, the rigid, gas permeable polymeric material 330b could be formed within a mold relative to which the location and/or orientation of the electronic apparatus 310 is known (e.g., by imaging the electronic apparatus 310 prior to curing the precursor material 330a and/or by disposing the electronic apparatus 310 at a specified location within the mold).

Figure 3F:
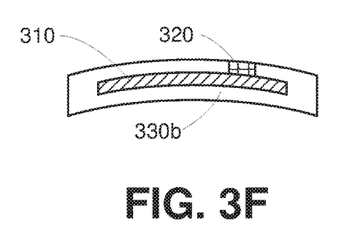
FIG. 3F illustrates elements of an eye-mountable device during fabrication of the eye-mountable device.

FIG. 3F shows the formed rigid, gas permeable polymeric material 330b after a further portion of the formed rigid, gas permeable polymeric material 330b has been removed. Such removal could be performed to form a second shape of the rigid, gas permeable polymeric material 330b (e.g., a shape of a contact lens that may be mounted to a corneal surface of an eye and that is compatible with eyelid motion when so mounted) more quickly, using less complicated methods and/or equipment, or according to some other improved consideration as the location of the electronic apparatus 310 within the first shape of the formed rigid, gas permeable polymeric material 330b (as shown in FIG. 3E) is known. The second shape of the rigid, gas permeable polymeric material 330b could be specified such that the formed rigid, gas permeable polymeric material 330b can be mounted to a corneal surface of an eye. In another example, the second shape could be specified such that the formed rigid, gas permeable polymeric material 330b can be mounted on or within a shaped soft polymeric material (e.g., such that the combination of the shaped soft polymeric material and the formed rigid, gas permeable polymeric material 330b mounted thereon or therein can be mounted to a corneal surface of an eye).

Figure 3G:
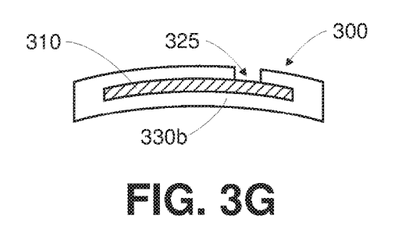
FIG. 3G illustrates an eye-mountable device.

FIG. 3G illustrates the electronic apparatus 310 and formed rigid, gas permeable polymeric material 330b after the sacrificial plug 320 has been removed. A window 325 formed in the rigid, gas permeable polymeric material 330b exposes a portion of the electronic apparatus 310 at the former location, relative to the electronic apparatus 310, of the sacrificial plug 320. Such a location could correspond to the location of a sensor, an electrode, an electrochemical battery, or some other element(s) of the electronic apparatus 310 such that the element(s) of the electronic apparatus 310 may be exposed to tear fluid or some other tissue or fluid of an eye when an eye-mountable device that includes the illustrated formed rigid, gas permeable polymeric material 330b and electronic apparatus 310 is mounted to the eye. Formation of the window 325 could include using a laser to ablate a portion of the formed rigid, gas permeable polymeric material 330b to form a window through the formed rigid, gas permeable polymeric material 330b to the sacrificial plug 320 before removal of the sacrificial plug 320. In such an embodiment, the sacrificial plug 320 could act to protect the electronic apparatus 310 (e.g., to protect a sensor, electrode, or other element(s) of the electronic apparatus 310) from being damaged by energy from the laser (e.g., the sacrificial plug 320 could act as a protectant and/or backstop during formation of a window through the formed rigid, gas permeable polymeric material 330b). Removal of the sacrificial plug 320 could include melting and/or evaporating the plug, dissolving the plug in a solvent, decomposing the plug by a chemical reaction, or removing the plug 320 by some other means. Additionally or alternatively, the sacrificial plug 320 may be removing by the methods used to remove portions of the formed rigid, gas permeable polymeric material 330b.

Note that the steps and elements described in combination with FIGS. 3A-3G are intended as non-limiting example embodiments; additional or alternative steps and/or elements are anticipated. For example, the sacrificial plug 320 could be omitted, and the rigid, gas permeable polymeric material 330b could be formed such that the electronic apparatus is fully embedded in the rigid, gas permeable polymeric material 330b. Alternatively, one or more windows, channels, or other features could be formed in the rigid, gas permeable polymeric material 330b (e.g., to expose sensors or other elements of the electronic apparatus 310) by removing a portion of the formed rigid, gas permeable polymeric material 330b, e.g., using a laser, a drill, or some other means. In another example, a shaped soft polymeric material could be formed around the formed rigid, gas permeable polymeric layer 330b. In yet another example, a chemical sensing enzyme or other sensor substance, a biocompatibility layer (e.g., a layer of a hydrophilic substance), a lubricant, or some other materials or substances could be disposed on the rigid, gas permeable polymeric material 330b and/or on the electronic apparatus 310 (e.g., a layer of hydrophilic polymer that contains glucose oxidase could be disposed within the window 325 on electrodes of a glucose sensor).

Further, an electronic apparatus could be at least partially embedded in a formed rigid, gas permeable polymeric material by forming and/or disposing the electronic apparatus on a first layer of rigid, gas permeable polymeric material and subsequently forming a second layer of rigid, gas permeable polymeric material on the electronic apparatus and the first layer of rigid, gas permeable polymeric material. The first layer of rigid, gas permeable polymeric material could have the form of a sheet, disc, lens, or other shape. In some examples, the first layer of rigid, gas permeable polymeric material could form part of an electronically actuated lens, e.g., the first layer could include an electrode, a textured surface configured to align a liquid crystal, or some other elements or features to facilitate operation of an electronically actuated lens. One or more further layers (e.g., discs) of rigid, gas permeable polymeric material or other materials (e.g., transparent electrodes, layers of liquid crystal) could be assembled together to form such an electronically actuated lens.

FIGS. 4A through 4G illustrate steps in an example process of fabricating an eye-mountable device that includes an electronic apparatus that is at least partially embedded within a rigid, gas permeable polymeric material as described herein. The process begins in FIG. 4A, which illustrates a first layer of rigid, gas permeable polymeric material 440. The first layer could be formed by one or more of a variety of processes, e.g., molding, machining, pressing, lathing, or some other process or processes. For example, the first layer of rigid, gas permeable polymeric material 440 could be formed by pressing a flat sheet of rigid, gas permeable polymeric material into a desired shape and subsequently removing the formed first layer of rigid, gas permeable polymeric material 440 from the remainder of the sheet. This removal (e.g., singulation) could occur between or during one of the steps illustrated in FIGS. 4A through 4G (e.g., a number of eye-mountable devices could be formed on a single sheet of rigid, gas permeable polymeric material, and could be removed from the sheet after a number of steps have been performed to fabricate the eye-mountable devices, e.g., after a number of electronic apparatus have been disposed on the sheet and after further layers of rigid, gas permeable polymeric material have been formed over the disposed electronic apparatus).

Figure 4A:
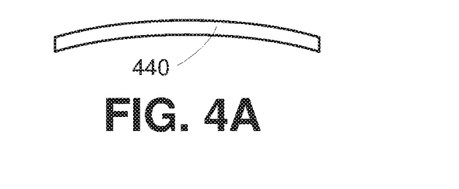
FIG. 4A illustrates elements of an eye-mountable device during fabrication of the eye-mountable device.
Figure 4B:
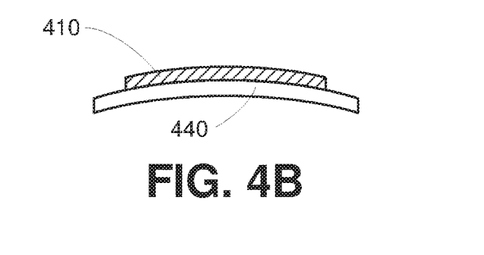
FIG. 4B illustrates elements of an eye-mountable device during fabrication of the eye-mountable device.

FIG. 4B shows an electronic apparatus 410 that has been formed and/or disposed on the first layer of rigid, gas permeable polymeric material 440 and that may be incorporated into a rigid, gas permeable polymeric material. The electronic apparatus 410 may include a variety of components (e.g., an electronically actuated lens, a controller, a loop antenna, a flexible substrate on which other components are formed/disposed, interconnects, a sensor, a battery) formed by a variety of processes or methods. Elements of the electronic apparatus 410 (e.g., a controller, a battery, interconnects, a loop antenna, a sensor) could be disposed on the first layer of rigid, gas permeable polymeric material 440. Additionally or alternatively, one or more components of the electronic apparatus 410 could be formed and/or disposed on a flexible substrate and disposing the electronic apparatus 410 on the first layer of rigid, gas permeable polymeric material 440 could include disposing the flexible substrate on the first layer of rigid, gas permeable polymeric material 440. This could include using an adhesive to secure the electronic apparatus 410 in place on the first layer of rigid, gas permeable polymeric material 440. Additionally or alternatively, ridges, pins, depressions, or other features formed in the first layer of rigid, gas permeable polymeric material 440 could be used to align the electronic apparatus 410 with the first layer of rigid, gas permeable polymeric material 440 and/or to secure the electronic apparatus 410 on the first layer of rigid, gas permeable polymeric material 440.

Figure 4C:
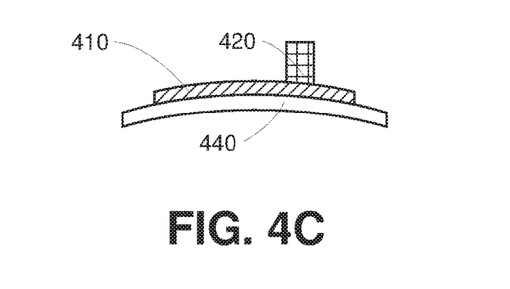
FIG. 4C illustrates elements of an eye-mountable device during fabrication of the eye-mountable device.

FIG. 4C illustrates the addition of a sacrificial plug 420 disposed on the electronic apparatus 410. The sacrificial plug could be disposed on a sensor, an electrode, or some other element(s) of the electronic apparatus whose operation is related to exposure to an environment of an eye-mountable device formed through the processes described herein. The sacrificial plug 420 can act to prevent rigid, gas permeable polymeric material from being formed, in later steps of the fabrication process illustrated in FIGS. 4A-G, over the element(s) of the electronic apparatus 410 such that those element(s) are exposed (e.g., to tear fluid or some other fluid or tissue in an environment of an eye-mountable device formed by a process that includes the steps illustrated in FIGS. 4A-G) and such that the electronic apparatus 410 is partially embedded (rather than fully embedded) within a rigid, gas permeable polymeric material.

Figure 4D:
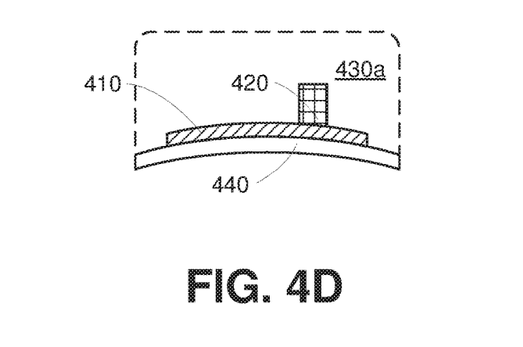
FIG. 4D illustrates elements of an eye-mountable device during fabrication of the eye-mountable device.

FIG. 4D illustrates the disposition of a precursor material 430*a* on the electronic apparatus 410, sacrificial plug 420, and first layer of rigid, gas permeable polymeric material 440. The precursor material 430*a* includes one or more monomers or other compounds or substances that can be cured to form a rigid, gas permeable polymeric material (e.g., to form a silicone acrylate material). Disposing the precursor material 430*a* could include disposing the precursor material 430*a* within a mold to which and/or in which the first layer of rigid, gas permeable polymeric material 440 is mounted.

Figure 4E:
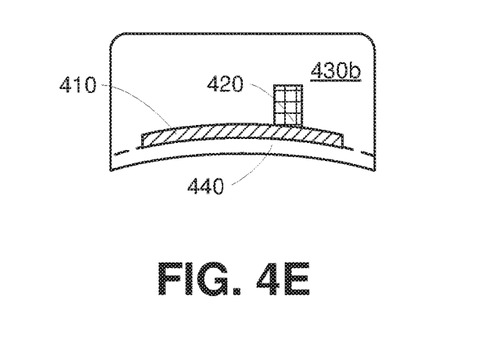
FIG. 4E illustrates elements of an eye-mountable device during fabrication of the eye-mountable device.

FIG. 4E illustrates the curing of the precursor material 430*a* to form a second layer of rigid, gas permeable polymeric material 430*b*. Curing the precursor material 430*a* could include exposing the precursor material 330*a* to heat, pressure, light (e.g., ultraviolet light), chemicals, an atmosphere having a specified property (e.g., an atmosphere that is low in humidity), or to some other factors or substances to cause and/or accelerate the formation of the second layer of rigid, gas permeable polymeric material 4E from the precursor material 430*a*. Additionally or alternatively, the precursor material 430*a* could be configured to cure over time without any particular triggering agent (e.g., the precursor material 430*a* could include a two-part mixture of substances that, when mixed, act to form the second layer of rigid, gas permeable polymeric material 430*b*); in such examples, curing the precursor material 430*a* could include allowing the precursor material 430*a* to cure for a specified period of time.

An eye-mountable device can then be formed by removing a portion of one or both of the first 430*b* and second 440 layers of rigid, gas permeable polymeric material. This can include polishing, lathing, or otherwise machining the layers of rigid, gas permeable polymeric material 430*b*, 440 to form a specified shape. Such a specified shape could be specified to permit mounting of the formed layers of rigid, gas permeable polymeric material 440, 430*b* to a corneal surface of an eye. Additionally or alternatively, such a specified shape could be specified to permit mounting of the first and second layers of rigid, gas permeable polymeric material 440, 430*b* on or within a shaped soft polymeric material and/or to permit the formation of such a shaped soft polymeric material on or around the first and second layers of rigid, gas permeable polymeric material 430*b*, 440 such that the first and second layers of rigid, gas permeable polymeric material 430*b*, 440 are at least partially embedded within the shaped soft polymeric material.

Figure 4F:
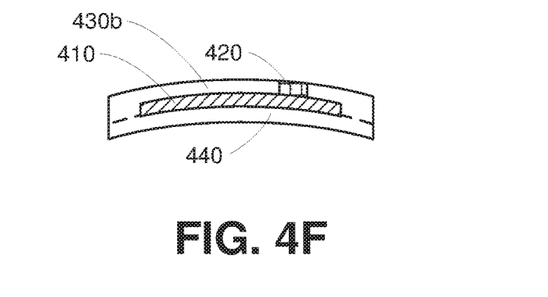
FIG. 4F illustrates elements of an eye-mountable device during fabrication of the eye-mountable device.

FIG. 4F shows the first and second layers of rigid, gas permeable polymeric material 430*b*, 440 after a portion of at least one of the first and second layers of rigid, gas permeable polymeric material 430*b*, 440 has been removed. The shape of the combination of the first and second layers of rigid, gas permeable polymeric material 430*b*, 440 could be specified such that the combination of the first and second layers of rigid, gas permeable polymeric material 430*b*, 440 can be mounted to a corneal surface of an eye. In another example, the shape could be specified such that the combination of the first and second layers of rigid, gas permeable polymeric material 430*b*, 440 can be mounted on or within a shaped soft polymeric material (e.g., such that the combination of the shaped soft polymeric material and the combination of the first and second layers of rigid, gas permeable polymeric material 430*b*, 440 mounted thereon or therein can be mounted to a corneal surface of an eye).

Figure 4G:
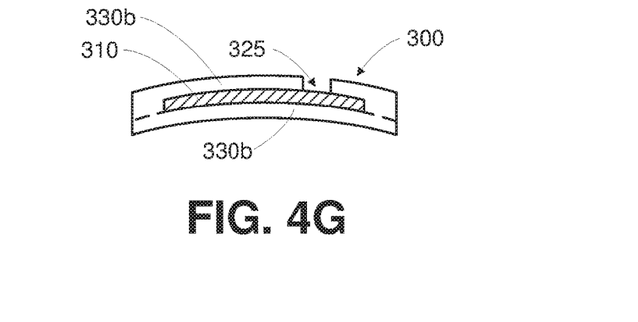
FIG. 4G illustrates an eye-mountable device.

FIG. 4G illustrates the electronic apparatus 410 and the first and second layers of rigid, gas permeable polymeric material 430*b*, 440 after the sacrificial plug 420 has been removed. A window 425 formed in the second layer of rigid, gas permeable polymeric material 430*b* exposes a portion of the electronic apparatus 410 at the former location, relative to the electronic apparatus 410, of the sacrificial plug 420. Formation of the window 425 could include using a laser to ablate a portion of the second layer of rigid, gas permeable polymeric material 430*b* to form a window through the second layer of rigid, gas permeable polymeric material 430*b* to the sacrificial plug 420 before removal of the sacrificial plug 420. In such an embodiment, the sacrificial plug 420 could act to protect the electronic apparatus 410 (e.g., to protect a sensor, electrode, or other element(s) of the electronic apparatus 410) from being damaged by energy from the laser (e.g., the sacrificial plug 420 could act as a protectant and/or backstop during formation of a window through the second layer of rigid, gas permeable polymeric material 430*b*). Such a location could correspond to the location of a sensor, an electrode, an electrochemical battery, or some other element(s) of the electronic apparatus 410 such that the element(s) of the electronic apparatus 410 may be exposed to tear fluid or some other tissue or fluid of an eye when an eye-mountable device that includes the illustrated first and second layers of rigid, gas permeable polymeric material 430*b*, 440 and electronic apparatus 410 is mounted to the eye.

Note that the steps and elements described in combination with FIGS. 4A-3G are intended as non-limiting example embodiments; additional or alternative steps and/or elements are anticipated. For example, the sacrificial plug 420 could be omitted, and the first and second layers of rigid, gas permeable polymeric material 430*b*, 440 could be formed such that the electronic apparatus is fully embedded in the combination of the first and second layers of rigid, gas permeable polymeric material 430*b*, 440. Alternatively, one or more windows, channels, or other features could be formed in one or both of the first and second layers of rigid, gas permeable polymeric material 430*b*, 440 (e.g., to expose sensors or other elements of the electronic apparatus 410) by removing a portion of the rigid, gas permeable polymeric material 430*b*, 440, e.g., using a laser, a drill, or some other means. In another example, a shaped soft polymeric material could be formed around the combination of the first and second layers of rigid, gas permeable polymeric material 430b, 440. In yet another example, a chemical sensing enzyme or other sensor substance, a biocompatibility layer (e.g., a layer of a hydrophilic substance), a lubricant, or some other materials or substances could be disposed on combination of the first and second layers of rigid, gas permeable polymeric material 430b, 440 and/or on the electronic apparatus 410 (e.g., a layer of hydrophilic polymer that contains glucose oxidase could be disposed within the window 425 on electrodes of a glucose sensor).

IV. Conclusion

Where example embodiments involve information related to a person or a device of a person, the embodiments should be understood to include privacy controls. Such privacy controls include, at least, anonymization of device identifiers, transparency and user controls, including functionality that would enable users to modify or delete information relating to the user's use of a product.

Further, in situations in where embodiments discussed herein collect personal information about users, or may make use of personal information, the users may be provided with an opportunity to control whether programs or features collect user information (e.g., information about a user's medical history, social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by a content server.

The particular arrangements shown in the Figures should not be viewed as limiting. It should be understood that other embodiments may include more or less of each element shown in a given Figure. Further, some of the illustrated elements may be combined or omitted. Yet further, an exemplary embodiment may include elements that are not illustrated in the Figures.

Additionally, while various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims. Other embodiments may be utilized, and other changes may be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are contemplated herein.

What is claimed is:

1. A method comprising:
    disposing an electronic apparatus on a first layer of a rigid, gas-permeable polymeric material;
    disposing a precursor material on the electronic apparatus and the first layer of the rigid, gas-permeable polymeric material;
    curing the precursor material to form a second layer of the rigid, gas-permeable polymeric material such that the electronic apparatus is at least partially embedded within the first and second layers; and
    forming an eye-mountable device, wherein forming the eye-mountable device comprises removing a portion of at least one of the first and second layers of the rigid, gas-permeable polymeric material based on information about a location or orientation of the electronic apparatus within the first and second layers.

2. The method of claim 1, further comprising:
    forming a sacrificial plug at a location on the electronic apparatus prior to disposing the precursor material on the electronic apparatus; and
    removing the sacrificial plug subsequent to curing the precursor material to form the second layer of rigid, gas-permeable polymeric material, wherein the formed eye-mountable device includes a window exposing a portion of the electronic apparatus at the location.

3. The method of claim 2, wherein the electronic apparatus comprises a sensor, wherein forming a sacrificial plug at the location on the electronic apparatus comprises forming the sacrificial plug over of the sensor, wherein when the formed eye-mountable device is mounted to an eye, tear fluid of the eye can contact the sensor via the window.

4. The method of claim 2, further comprising, subsequent to curing the precursor material to form the second layer of rigid, gas-permeable polymeric material and prior to removing the sacrificial plug:
    operating a laser to form a window through the second layer of rigid, gas-permeable polymeric material to the sacrificial plug.

5. The method of claim 1, wherein the electronic apparatus of the formed eye-mountable device is fully embedded within the first and second layers of the rigid, gas-permeable polymeric material.

6. The method of claim 5, wherein forming the eye-mountable device further comprises:
    forming a shaped soft polymeric material comprising a hydrogel such that the first and second layers of the rigid, gas-permeable polymeric material are fully embedded within the formed shaped soft polymeric material.

7. The method of claim 1, wherein forming an eye-mountable device by removing a portion of at least one of the first and second layers of the rigid, gas-permeable polymeric material comprises removing a portion of at least one of the first and second layers of the rigid, gas-permeable polymeric material such that the eye-mountable device can be removably mounted over a corneal surface of the eye in a manner that is compatible with eyelid motion when the eye-mountable device is so mounted.

8. A method comprising:
    disposing an electronic apparatus within a precursor material;
    curing the precursor material to form a rigid, gas-permeable polymeric material such that the electronic apparatus is at least partially embedded in the rigid, gas-permeable polymeric material; and
    forming an eye-mountable device, wherein forming the eye-mountable device comprises removing a portion of the rigid, gas-permeable polymeric material based on information about a location or orientation of the electronic apparatus within the rigid, gas-permeable polymeric material.

9. The method of claim 8, wherein disposing an electronic apparatus within a precursor material comprises:
    partially filling a mold with an amount of the precursor material;

disposing the electronic apparatus within the mold on the surface of the precursor material; and disposing an additional amount of the precursor material within the mold.

10. The method of claim 8, further comprising:

forming a sacrificial plug at a location on the electronic apparatus prior to disposing the electronic apparatus within the precursor material; and removing the sacrificial plug subsequent to curing the precursor material to form the rigid, gas-permeable polymeric material, wherein the formed eye-mountable device includes a window exposing a portion of the electronic apparatus at the location.

11. The method of claim 10, wherein the electronic apparatus comprises a sensor, wherein forming a sacrificial plug at the location on the electronic apparatus comprises forming the sacrificial plug over the sensor, wherein when the formed eye-mountable device is mounted to an eye, tear fluid of the eye can contact the sensor via the window.

12. The method of claim 10, further comprising, subsequent to curing the precursor material to form the further rigid, gas-permeable polymeric material and prior to removing the sacrificial plug:

operating a laser to form a window through the further rigid, gas-permeable polymeric material to the sacrificial plug.

13. The method of claim 8, wherein the electronic apparatus of the formed eye-mountable device is fully embedded within the formed rigid, gas-permeable polymeric material, wherein forming the eye-mountable device further comprises:

forming a shaped soft polymeric material comprising a hydrogel such that the rigid, gas-permeable polymeric material is fully embedded within the formed shaped soft polymeric material.

14. The method of claim 8, wherein removing the portion of the gas-permeable polymeric material comprises removing the portion of the rigid, gas-permeable polymeric material such that the eye-mountable device is shaped to removably mount over a corneal surface of the eye in a manner that is compatible with eyelid motion when the eye-mountable device is so mounted.

15. The method of claim 1, further comprising:

forming a plurality of eye-mountable devices, including the eye mountable device, on a sheet of the rigid gas-permeable polymeric material; and removing the eye mountable devices from the sheet.

16. The method of claim 1, wherein forming the eye-mountable device further comprises:

disposing a precursor material within a mold within which or upon which the first layer of the rigid, gas permeable polymeric material is mounted.

17. The method of claim 1, wherein the electronic apparatus comprises an electronically actuated lens.

18. The method of claim 17, wherein the electronic apparatus comprises one or more electronic components disposed on a flexible substrate.

19. The method of claim 17, wherein the rigid gas-permeable polymeric material is mounted on or within a hydrogel.

20. The method of claim 19, wherein the hydrogel is shaped to conformably mount the eye-mountable device onto a corneal surface of an eye and is removable from the rigid gas-permeable polymeric material.

21. The method of claim 1, wherein removing the portion of the rigid, gas-permeable polymeric material centers the electronic apparatus within remaining rigid, gas-permeable polymeric material.

22. The method of claim 21, further comprising removing a second portion of the rigid, gas-permeable polymeric material such that a surface of the rigid, gas-permeable polymeric material is shaped to be mounted to a corneal surface of an eye.

23. The method of claim 22, wherein a method of removing the portion of at least one of the first and second layers of the rigid, gas-permeable polymeric material is different than a method of removing the second portion of the rigid, gas-permeable polymeric material.

24. A method comprising:

disposing an electronic apparatus within a precursor material;

curing the precursor material to form a rigid, gas-permeable polymeric material such that the electronic apparatus is at least partially embedded in the rigid, gas-permeable polymeric material;

removing a first portion of the rigid, gas-permeable polymeric material based on information about a location or orientation of the electronic apparatus within the rigid, gas-permeable polymeric material; and removing a second portion of the rigid, gas-permeable polymeric material such that a surface of the rigid, gas-permeable polymeric material is shaped to be mounted to a corneal surface of an eye.

* * * * *